(12) United States Patent
Alves

(10) Patent No.: US 8,904,961 B1
(45) Date of Patent: Dec. 9, 2014

(54) OVERHEAD HANGING BIRD WATERER THAT CAN DELIVER WATER TO BIRDS IN SANITARY MANNER

(71) Applicant: Donald Francis Alves, Anderson, CA (US)

(72) Inventor: Donald Francis Alves, Anderson, CA (US)

( * ) Notice: Subject to any disclaimer, the term of this patent is extended or adjusted under 35 U.S.C. 154(b) by 266 days.

(21) Appl. No.: 13/663,691

(22) Filed: Oct. 30, 2012

(51) Int. Cl.
*A01K 39/00* (2006.01)
*A01K 39/024* (2006.01)
*A01K 39/02* (2006.01)

(52) U.S. Cl.
CPC .......... *A01K 39/0213* (2013.01); *A01K 39/024* (2013.01)
USPC ............................................ 119/72; 119/72.5

(58) Field of Classification Search
CPC .......................... A01K 39/0213; A01K 39/024
USPC ........................................ 119/72, 72.5, 78, 71
IPC ................ A01K 7/00, 7/02, 7/04, 7/06, 39/024, A01K 39/02
See application file for complete search history.

(56) References Cited

U.S. PATENT DOCUMENTS

| | | | | |
|---|---|---|---|---|
| 2,775,227 A * | 12/1956 | Millies | .......................... | 119/72.5 |
| 4,527,513 A * | 7/1985 | Hart et al. | ..................... | 119/51.5 |
| 5,099,798 A * | 3/1992 | Ohara | .............................. | 119/80 |
| 5,284,110 A * | 2/1994 | Hostetler | ........................ | 119/72 |
| 5,456,210 A * | 10/1995 | Miller | .............................. | 119/75 |
| 5,924,382 A * | 7/1999 | Shumaker | ....................... | 119/72 |
| 5,996,530 A * | 12/1999 | Miller et al. | ................. | 119/51.5 |
| 6,170,435 B1 * | 1/2001 | Momont et al. | ............. | 119/72.5 |
| 6,619,231 B2 * | 9/2003 | Darby et al. | .................... | 119/72 |
| 6,712,021 B2 * | 3/2004 | Pollock | .......................... | 119/72 |
| 6,854,420 B2 | 2/2005 | Crocker | | |
| 8,056,509 B1 * | 11/2011 | Hostetler | ........................ | 119/72 |
| 2004/0141874 A1 * | 7/2004 | Mullinax | .......................... | 422/4 |
| 2005/0160994 A1 * | 7/2005 | Pollock et al. | .................. | 119/72 |
| 2007/0215056 A1 * | 9/2007 | Kreger et al. | ................ | 119/72.5 |
| 2010/0192865 A1 * | 8/2010 | Hawk | ................................ | 119/72 |
| 2012/0285390 A1 * | 11/2012 | Katz et al. | ....................... | 119/72 |

FOREIGN PATENT DOCUMENTS

EP            519149 A1 *  12/1992 ............... A01K 7/06

* cited by examiner

*Primary Examiner* — Shadi Baniani
(74) *Attorney, Agent, or Firm* — Plager Schack LLP

(57) ABSTRACT

An overhead hanging bird waterer can deliver water to birds in a sanitary manner. The overhead hanging bird waterer comprises a main unit covered by an upper cap. The upper cap allows for the water to flow into the main unit and also covers the main unit to prevent debris from entering the main unit. The main unit is mechanically coupled to a support hanger. The support hanger is hung from hanger support. The main unit is further mechanically coupled to a nipple pipe arm and is mechanically coupled to nipples which comprise a nipple stem. The water flows from the main unit through a drain pipe through the nipple pipe arm into the nipples. This enables the birds to obtain the water from the nipples by pushing the nipple stem up or 360 degrees sideways in any direction with minimum water spilling creating enhanced sanitation and better quality produce.

3 Claims, 4 Drawing Sheets

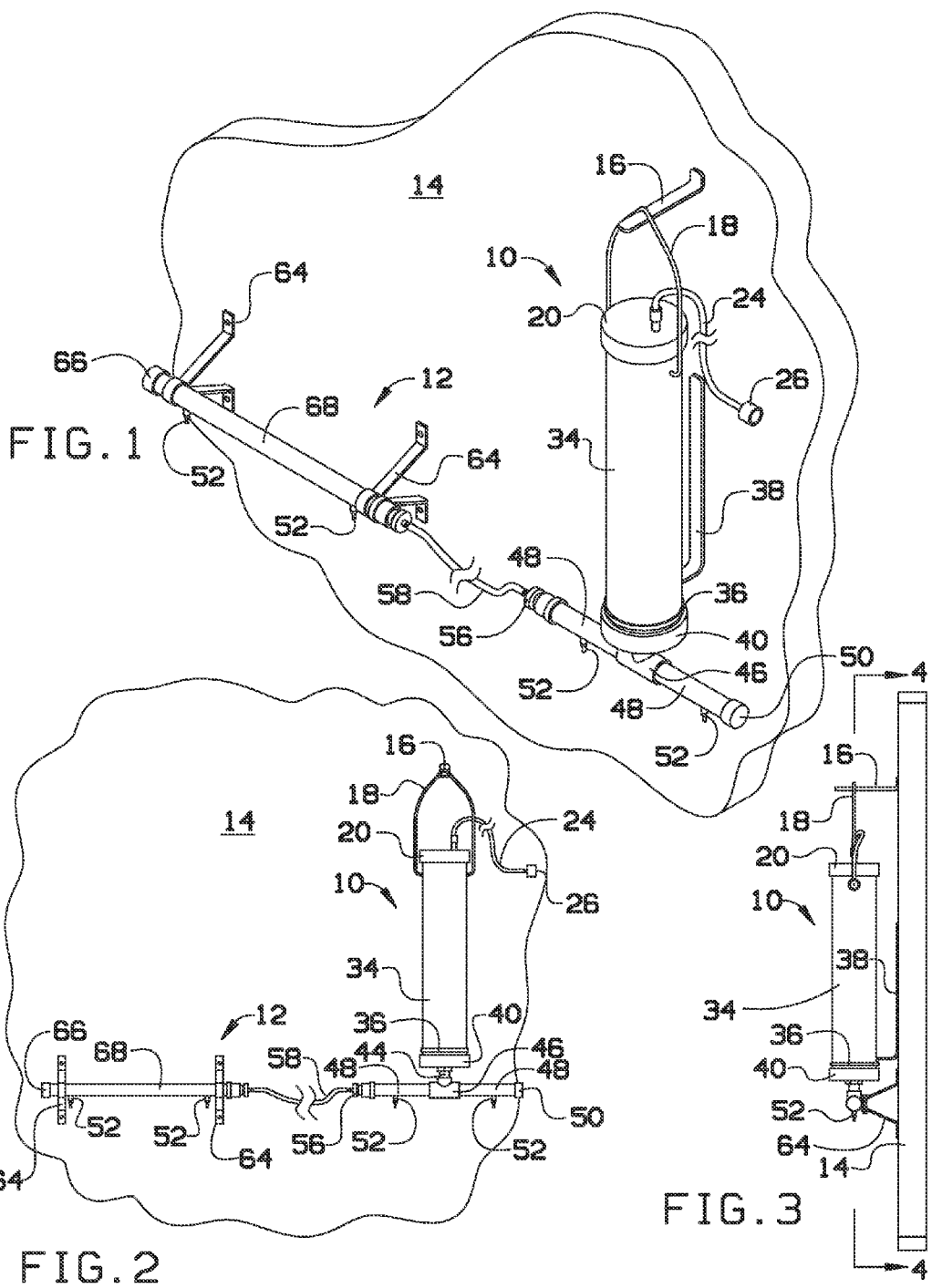

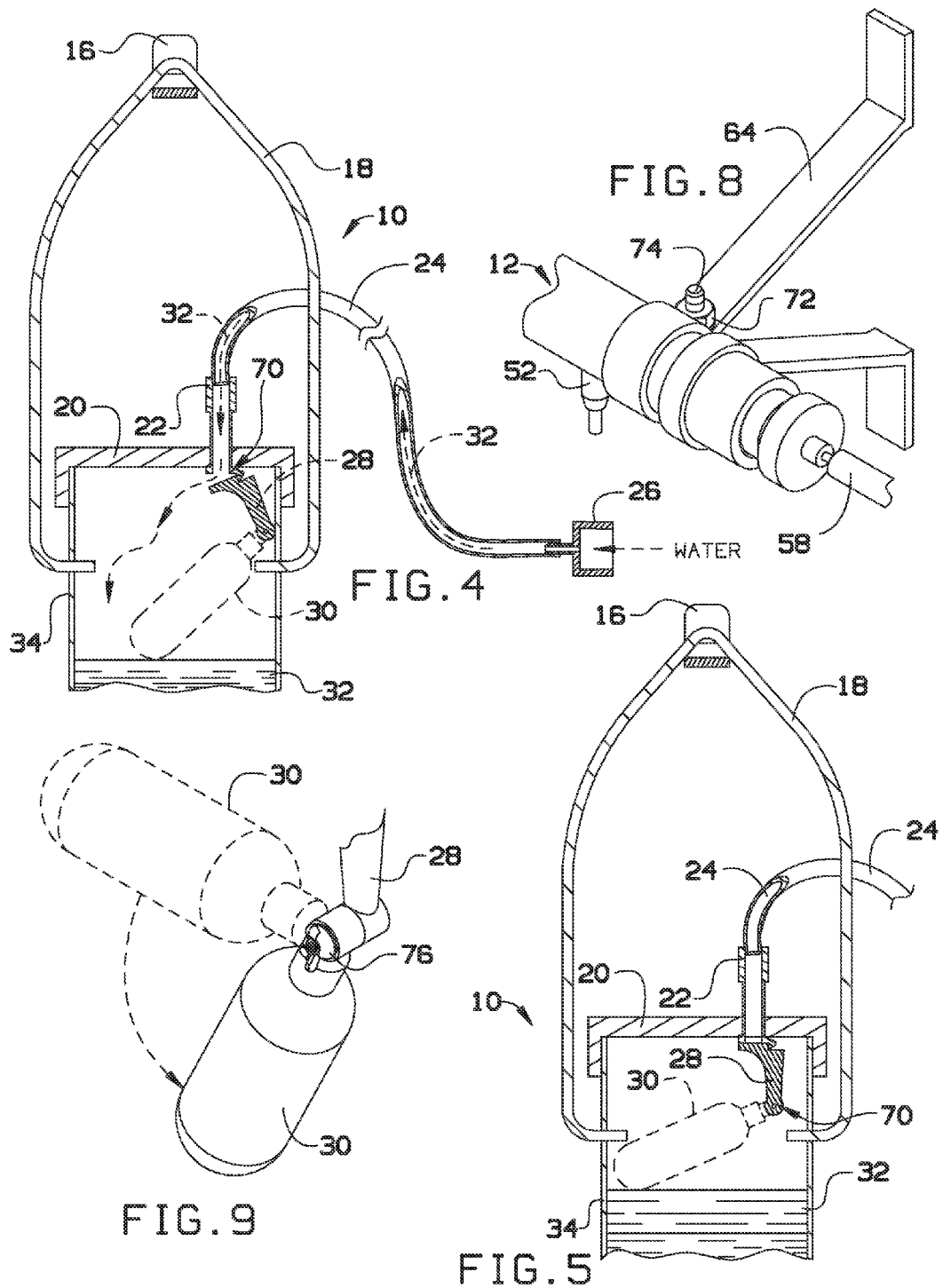

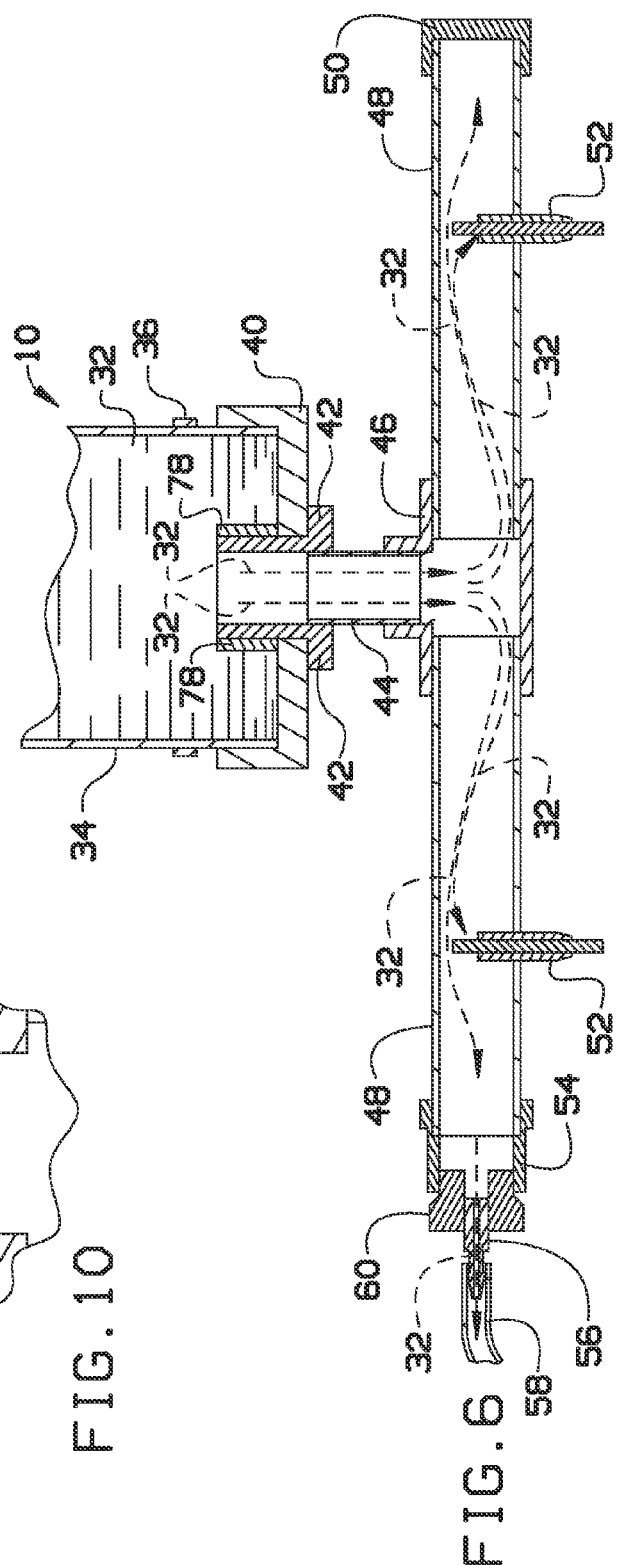

OVERHEAD HANGING BIRD WATERER THAT CAN DELIVER WATER TO BIRDS IN SANITARY MANNER

FIELD OF THE INVENTION

This invention relates to devices that can be used for distributing water to birds.

BACKGROUND OF THE INVENTION

Domesticated birds have been kept in enclosures for thousands of years, until the 20th century they consumed water in containers on the ground. The ground waterer is largely unsanitary since dust and feces can blow into the containers, causing the growth of fungi and bacteria. The fungi and bacteria partially poison the birds and affecting the quality of produce. Several recent advances have attempted to resolve these problems with minimal success. The prior art includes U.S. Pat. No. 5,099,798 issued to Ohara and U.S. Pat. No. 6,854,420 issued to Croker.

Ohara teaches an overhead watering trough that causes a mess in that the arrangement of nipples causes water to fall onto the ground into a trough which has difficulties of the water containers noted above. The "side to side" nipple taught in the present invention is superior to the "push-up" nipple in Ohara because the side to side nipple is easier for birds to use.

Crocker teaches an archaic water valve, allows airborne debris to enter tank. Crocker's water valve is totally different and relies on weight of water to cause a downward pull at the fulcrum end. This, in turn, causes the rounded opposed end of the fulcrum arm to be pushed into the resilient liquid supply tube consequently cutting off the water supply to the drinker. This construction leaves no means to anchor the device to a fixed surface above.

Ground water drinkers create a bad smelling mess. The present invention solves that problem with a cleaner system which is completely contained, above bird head level and isolated from outdoor contaminants.

BRIEF SUMMARY OF THE INVENTION

An overhead hanging bird waterer can deliver water to birds in a sanitary manner. The overhead hanging bird waterer comprises a main unit covered by an upper cap. The upper cap allows for the water to flow into the main unit and also covers the main unit to prevent debris from entering the main unit. The main unit is mechanically coupled to a support hanger. The support hanger is hung from a hanger support. The main unit is further mechanically coupled to a nipple pipe arm is mechanically coupled to nipples which comprise a nipple stem. The water flows from the main unit through a drain pipe through the nipple pipe arm into the nipples. This enables the birds to obtain the water from the nipples by pushing the nipple stem with minimum water spilling creating enhanced sanitation and better quality produce.

In some embodiments, the main unit is mechanically coupled to the nipple pipe arm in this manner: the main unit is further mechanically coupled to a main unit support ring. The main unit support ring is mechanically coupled to lower main body. The lower main body is mechanically coupled to the drain pipe. The drain pipe is mechanically coupled to the nipple pipe arm. This arrangement prevents the water from leaking from the main unit while being transferred to the nipple pipe arm creating enhanced sanitation and better quality produce.

In some embodiments, as the water fills the main unit the water passes a float valve. The float valve comprises a float mechanically coupled to float arm. As the water fills the main unit the float rises and rotates. The water can rise high enough for the float arm to exert pressure on the float valve which will block the flow of the water into the main unit when the main unit is full of the water. In this manner, the float valve prevents the water from overflowing out of the main unit, which creates enhanced sanitation and better quality produce, In some embodiments, the nipple pipe arm is mechanically coupled to a nipple pipe to a nipple pipe arm collar, which is coupled to the nozzle fitting threaded adapter. The nipple pipe arm nozzle is mechanically coupled to a remote water feed line. The remote water feed line is mechanically coupled to a remote feeder pipe arm nozzle. The remote feeder pipe nozzle is mechanically coupled to a remote feeder pipe nozzle fitting threaded adapter. The remote feeder pipe nozzle fitting threaded adapter is mechanically coupled to a remote feeder pipe collar. The remote feeder pipe collar is mechanically coupled to a remote feeder pipe. The remote feeder pipe is mechanically coupled to feeder nipples. In this manner the nipple pipe arm can provide the water to the birds in a first location and the remote feeder pipe can provide the water to the birds in a second location. This offers further sanitary advantage because it allows the user to space out the birds which increases sanitation and reduces potential spread of disease.

BRIEF DESCRIPTION OF THE SEVERAL VIEWS OF THE DRAWINGS

Figure 12:
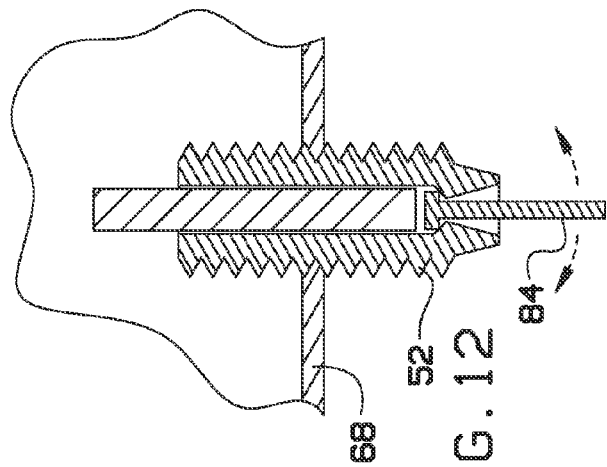
Figure 11:
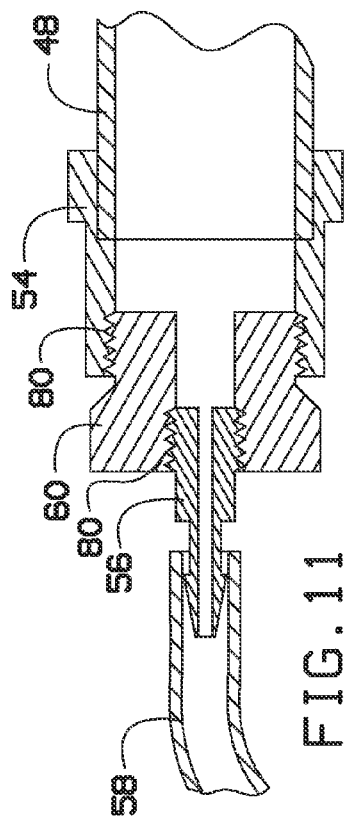
Figure 7:
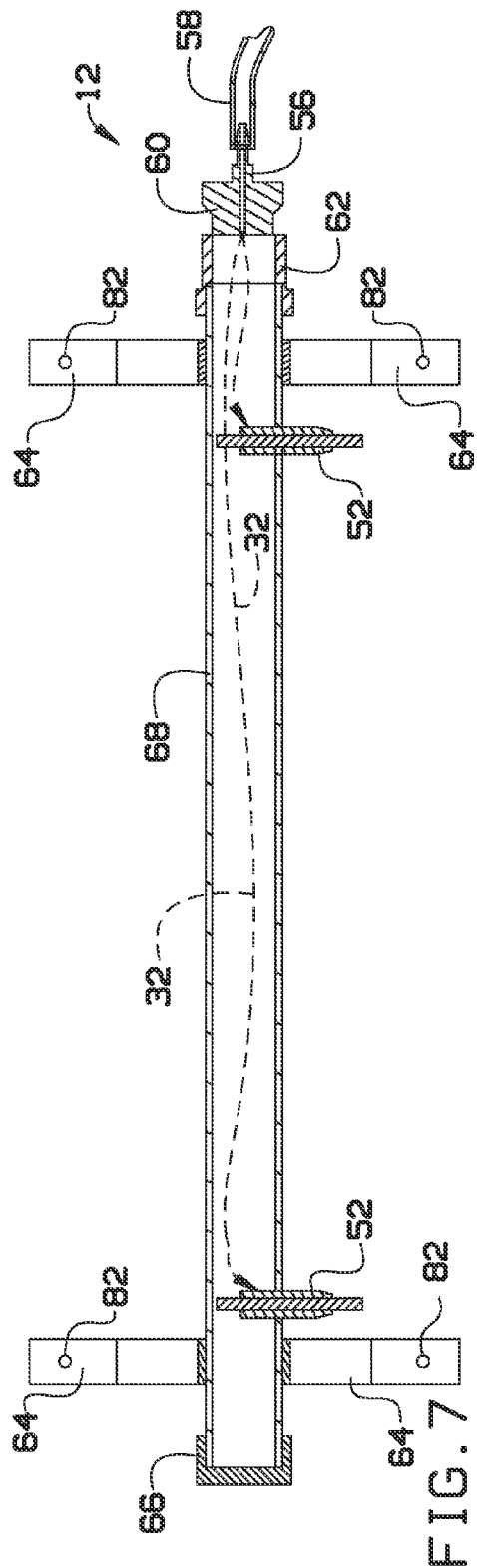

Having thus described the invention in general terms, reference will now be made to the accompanying drawings, which are not necessarily drawn to scale, and wherein:

FIG. 1 is a perspective view of the invention.
FIG. 2 is a front view of the invention.
FIG. 3 is a side view of the invention.
FIG. 4 is a section detail view of the invention line 4-4 in FIG. 3 illustrating the float valve in an open configuration.
FIG. 5 is a section detail view of the invention illustrating the float valve in a closed configuration.
FIG. 6 is a section detail view of the invention illustrating the lower component of the main body.
FIG. 7 is a section detail view of the invention illustrating the remote body.
FIG. 8 is a perspective detail view of the invention.
FIG. 9 is a perspective detail view of the invention.
FIG. 10 is a section detail view of the invention.
FIG. 11 is a section detail view of the invention.
FIG. 12 is a section detail view of the invention.

DETAILED DESCRIPTION OF THE INVENTION

Embodiments of the present invention overcome many of the obstacles associated with distributing water to birds, and now will be described more fully hereinafter with reference to the accompanying drawings that show some, but not all embodiments of the claimed inventions. Indeed, the invention may be embodied in many different forms and should not be construed as limited to the embodiments set forth herein. Rather, these embodiments are provided so that this disclosure will satisfy applicable legal requirements. Like numbers refer to like elements throughout.

FIG. 1, FIG. 2 and FIG. 3 show perspective views of the overhead hanging bird waterer. Bird waterer 10 comprises main unit 34. Main unit 34 is covered by upper cap 20 as shown in FIG. 4 and FIG. 5. Upper cap 20 is mechanically coupled to water line 24 which is further mechanically coupled to water line port cap 26 as shown in more detail in FIG. 4 and FIG. 5. Main unit 34 is mechanically coupled to support hanger 18. Support hanger 18 can be hung from hanger support 16. Hanger support 16 and stabilizer bracket 38 are mechanically coupled to wall 14 as shown in more detail in FIG. 3.

Stabilizer bracket 38 is mechanically coupled to main unit 34. Main unit 34 is mechanically coupled to main unit support ring 36. Main unit support ring 36 is mechanically coupled to lower main body tube 34 as shown in FIG. 6.

Lower main body 40 is mechanically coupled to drain pipe 44. Drain pipe 44 is mechanically coupled to connector 46 and nipple pipe arm 48 as shown in FIG. 6 and FIG. 10. Connector 46 is immediately adjacent to nipple pipe arm 48.

Nipple pipe arm 48 is mechanically coupled to nipple pipe cap 50 and chicken nipple 52 as shown in FIG. 6 and FIG. 12. In some embodiments, both ends of nipple pipe arm 48 are mechanically coupled to nipple pipe cap 50. In other embodiments, nipple pipe arm 48 is mechanically coupled to nipple pipe arm nozzle fitting 56.

Nipple pipe arm nozzle fitting 56 is mechanically coupled to remote water feed line 58 as shown in FIG. 6. Remote water feed line 58 is mechanically coupled to remote feeder pipe 68 as shown in more detail in FIG. 7. Like nipple pipe arm 48, remote feeder pipe is mechanically coupled to feeder nipples 52 as shown in FIG. 7 and FIG. 12. Remote feeder pipe 68 is mechanically coupled to feeder pipe end cap 66. Remote feeder pipe 68 is mechanically coupled to wall 14 by mount brackets 64 as shown in more detail in FIG. 8. In this manner nipple pipe arm 48 can provide water to birds in a first location and remote feeder pipe 68 can provide water to birds in a second location. Of course, a user could attach as many remote feeder pipes 68 as desired providing water to a number of locations.

FIG. 4, FIG. 5 and FIG. 9 show how water enters and is kept out of main unit 34. Main unit 34 is covered with upper cap 20. Upper cap 20 is mechanically coupled to upper cap nozzle 22. Upper cap nozzle 22 is mechanically coupled to water line 24. Water line 24 is mechanically coupled to water line port cap 26. Water line port cap 26 is mechanically coupled to a water source.

The water source moves water 32 into water line port cap 26 which travels through water line 24 until water 32 enters and begins to fill main unit 34. As water 32 fills main unit 34, water 32 passes float valve 70. Float valve 70 comprises float valve air capsule 30 mechanically coupled to float arm 28 by floater tension wing nut 76. Float valve air capsule 30 rises and rotates with float arm 28. Eventually, water 32 will rise high enough for float valve air capsule 30 to exert pressure on float arm 28 which will block the flow of water 32 into main unit 34 as shown in FIG. 5. From main unit 34 water 32 flows into nipple pipe arm 48 as shown in FIG. 6.

FIG. 6 shows the flow of water 32 through nipple pipe arm 48. Main unit 34 is mechanically coupled to lower main body 40 as noted above. Lower main body 40 is mechanically coupled to retainer 42 by coupler 78. Water 32 flows through retainer 42 through drain pipe 44 an into nipple pipe arm 48. As shown in FIG. 10, drain pipe 44 can be equipped with threads 80 and be screwed into retainer 42 and connector 46.

Nipple pipe arm 48 is mechanically coupled to nipple pipe arm nozzle fitting 56 by nipple pipe arm collar 54. Nipple pipe arm nozzle fitting 56 is mechanically coupled to remote water feed line 58 as noted above which allows water 32 to flow into remote feeder pipe 68 as shown in FIG. 7. FIG. 11 shows that nipple pipe arm collar 54 is mechanically coupled to nipple pipe arm nozzle fitting 56 by threads 80. Nipple pipe arm nozzle fitting 56 is mechanically coupled to nozzle fitting threaded adapter 60 by threads 80. Nipple pipe arm nozzle fitting 56 is mechanically coupled to remote water feed line 58.

FIG. 7 shows a section view of remote feeder pipe 68. Remote water feed line 58 is mechanically coupled to nipple pipe arm nozzle fitting 56. Remote feeder pipe arm nozzle fitting 56 is mechanically coupled to remote feeder pipe nozzle fitting adapter 60 by threads 80. Remote feeder pipe nozzle fitting 60 is mechanically coupled to remote feeder pipe collar 62 by threads 80. Remote feeder pipe collar 62 is mechanically coupled to remote feeder pipe 68. Remote feeder pipe 68 is mechanically coupled to feeder pipe end cap 66.

Remote feeder pipe 68 is mechanically coupled to wall 14 with connector bracket 64 with fastener 82, as shown in FIG. 8. Connector bracket 64 wraps around remote feeder pipe 68 and is held in place with tension fastener 72 and tension nut 74. Water 32 flows from remote water feed line 58 through remote feeder pipe 68 where water 32 flows to feeder nipples 52 which are shown in more detail in FIG. 8. This offers further sanitary advantages because the birds can be spaced out into multiple locations which helps to prevent the spread of disease.

FIG. 8 shows the operation of feeder nipple 52 which is identical to chicken nipple 52. Feeder nipple 52 comprises a lower solid nipple stem 84 and an upper solid nipple stem 84, which incorporates an all stainless steel body and is threaded to remote feeder pipe 68. As a bird pushes up or side to side on nipple stem 84, water 32 travels around nipple stem 84 to the bird. When the bird is finished drinking the bird ceases to put pressure on nipple stem 84, water 32 ceases to travel around nipple stem 84 and therefore does not flow onto the ground avoiding the sanitary mess created by the prior art. This construction allows minimum water spilling onto the ground. As used here, minimum water spilling onto the ground means that water does not accumulate on the ground. Birds can overflow their beaks with water resulting in some water falling to the ground, however, this amount of water is very small when compared to the prior art and is not sufficient to accumulate on the ground.

The application calls this arrangement a flow of water in a sanitary manner when water does not, or is less likely to accumulate on the ground. This sanitary manner leads to higher quality produce because birds are not consuming water contaminated with filth.

While the overhead bird waterer can be made from a number of materials using known techniques, the following are recommendations. Remote feeder pipe 68, main unit 34 and nipple pipe arm 48 can be made from polyvinyl chloride (PVC) pipe that are perforated with a drill to accommodate chicken nipple 52 and feeder nipple 52. Preferably, chicken nipple 52 and feeder nipple 52 are made of stainless steel which does not rust.

That which is claimed:

1. An overhead hanging bird waterer that can deliver water to birds in a sanitary manner, the overhead hanging bird waterer comprising,
    a main unit covered by an upper cap; the upper cap is mechanically coupled to a water line; where the upper cap allows for the water to flow into the main unit and covers the main unit to prevent debris from entering the main unit;
    the main unit is mechanically coupled to a support hanger; the support hanger is hung from a hanger support;

the main unit is further mechanically coupled to a nipple pipe arm; the nipple pipe arm is mechanically coupled to nipples comprising a nipple stem;

wherein the water flows from the main unit through a drain pipe through the nipple pipe arm into the nipples to enable the birds to obtain the water from the nipples by pushing the nipple stem with minimum water spilling creating enhanced sanitation and better quality produce; the main unit is mechanically coupled to the nipple pipe arm and further mechanically coupled to a lower main body; the lower main body is mechanically coupled to the drain pipe with a retainer by a coupler with threads; the drain pipe is mechanically coupled to the nipple pipe arm; wherein the main unit connection with the nipple pipe arm, the lower main body, and the drain pipe with the retainer prevent the water from leaking from the main unit while being transferred to the nipple pipe arm which further reduces the water spilling and creates enhanced sanitation and better quality produce;

the nipple pipe arm is mechanically coupled to a nipple pipe arm nozzle fitting by a nipple pipe arm collar; the nipple pipe arm nozzle fitting is mechanically coupled to a nozzle fitting threaded adapter which is further mechanically coupled to the nipple pipe arm collar; a nipple pipe arm nozzle is mechanically coupled to a remote water feed line;

the remote water feed line is mechanically coupled to a remote feeder pipe arm nozzle fitting; the remote feeder pipe arm nozzle fitting is mechanically coupled to the nozzle fitting threaded adapter; the nozzle fitting threaded adapter is mechanically coupled to a remote feeder pipe collar; the remote feeder pipe collar is mechanically coupled to a remote feeder pipe; the remote feeder pipe is mechanically coupled to feeder nipples;

wherein the nipple pipe arm provides the water to the birds in a first location and the remote feeder pipe provides the water to the birds in a second location which offers a further sanitary advantage of spacing out the birds to prevent disease.

2. The overhead hanging bird waterer of claim 1, the main unit is mechanically coupled to the nipple pipe arm; wherein the main unit is further mechanically coupled to a main unit support ring; the main unit support ring is mechanically coupled to lower main body; the lower main body is mechanically coupled to the drain pipe; the drain pipe is mechanically coupled to the nipple pipe arm;

wherein the main unit connection with the nipple pipe arm, the main unit support ring, the lower main body, and the drain pipe prevent the water from leaking from the main unit while being transferred to the nipple pipe arm which further reduces the water spilling and creates enhanced sanitation and better quality produce.

3. The overhead hanging bird waterer of claim 1, as the water fills the main unit the water passes a float valve; the float valve comprises a float mechanically coupled to float arm; as the water fills the main unit the float rises and rotates; the water can rise high enough for the float arm to exert pressure on the float valve which will block the flow of the water into the main unit when the main unit is full of the water;

wherein the float valve prevents the water from overflowing out of the main unit, which creates enhanced sanitation and better quality produce.

* * * * *